United States Patent
Shuto et al.

(10) Patent No.: US 8,542,431 B2
(45) Date of Patent: Sep. 24, 2013

(54) ELECTROPHORETIC DEVICE, DISPLAY UNIT, AND ELECTRONIC UNIT

(75) Inventors: Aya Shuto, Kanagawa (JP); Hidehiko Takanashi, Kanagawa (JP); Ken Kobayashi, Kanagawa (JP); Atsuhito Yasui, Kanagawa (JP); Ryo Kasegawa, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/421,096

(22) Filed: Mar. 15, 2012

(65) Prior Publication Data

US 2012/0314273 A1    Dec. 13, 2012

(30) Foreign Application Priority Data

Mar. 22, 2011    (JP) .................................. 2011-062921

(51) Int. Cl.
*G02B 26/00*    (2006.01)
*G09G 3/34*    (2006.01)
*G03G 17/04*    (2006.01)

(52) U.S. Cl.
USPC .............................. 359/296; 345/107; 430/32

(58) Field of Classification Search
USPC ................ 359/296, 245, 253–254, 290–291, 359/298; 349/33; 345/49, 105, 107; 430/31–32
See application file for complete search history.

(56) References Cited

U.S. PATENT DOCUMENTS

| | | | |
|---|---|---|---|
| 3,892,568 A | 7/1975 | Ota | |
| 2001/0041339 A1* | 11/2001 | Anderson et al. | 435/6 |
| 2007/0196401 A1* | 8/2007 | Naruse et al. | 424/401 |
| 2008/0112040 A1* | 5/2008 | Suwabe et al. | 359/296 |

FOREIGN PATENT DOCUMENTS

| | | |
|---|---|---|
| JP | 50-15115 | 6/1975 |
| JP | 50-15120 | 6/1975 |
| JP | 2002-244163 | 8/2002 |
| JP | 2005-107146 | 4/2005 |
| JP | 2005-128143 | 5/2005 |
| JP | 4188091 | 9/2008 |

* cited by examiner

*Primary Examiner* — Dawayne A Pinkney
(74) *Attorney, Agent, or Firm* — Sheridan Ross P.C.

(57) ABSTRACT

An electrophoretic device includes an electrophoretic particle, a porous layer formed of a fibrous structure containing a non-electrophoretic particle having optical reflection characteristics different from optical reflection characteristics of the electrophoretic particle, and a pair of electrodes arranged with the porous layer in between. The porous layer is adjacent to one or both of the pair of electrodes.

10 Claims, 8 Drawing Sheets

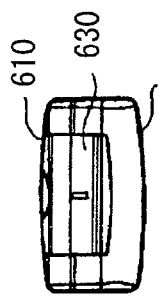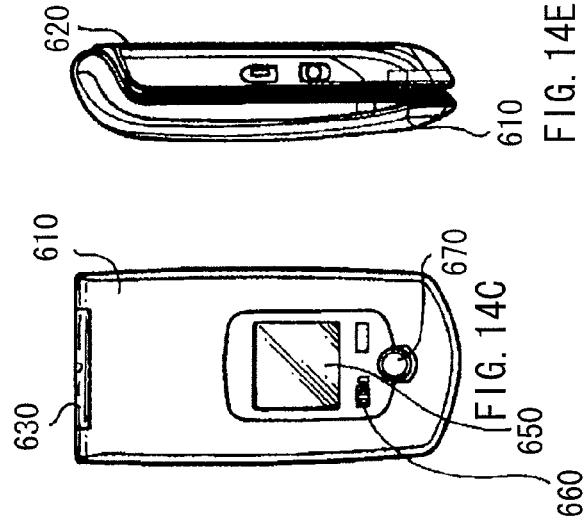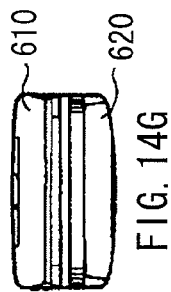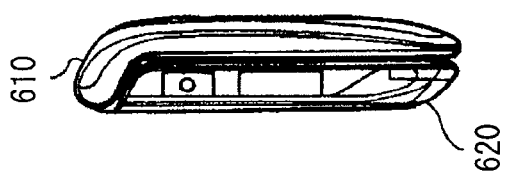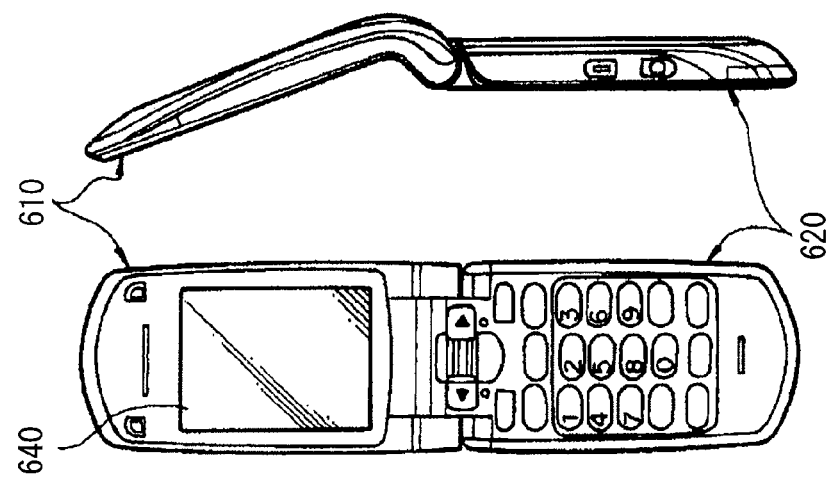

ELECTROPHORETIC DEVICE, DISPLAY UNIT, AND ELECTRONIC UNIT

BACKGROUND

The present technology relates to an electrophoretic device containing an electrophoretic particle and a porous layer, a display unit using the electrophoretic device, and an electronic unit using the display unit.

Lately, as various electronic devices such as mobile phones and personal digital assistants (PDA) become widely used, display units (displays) with low power consumption and high image quality have been increasingly demanded. Specially, in recent years, in association with birth of delivery business of electronic books, electronic book terminals for the purpose of reading textual information for a long time have attracted attentions. Therefore, displays having display quality suitable for such a reading purpose have been aspired.

As the display for reading, cholesteric liquid crystal displays, electrophoretic displays, electrochromic displays, twist ball displays and the like have been proposed. Specially, displays categorized as reflective type displays are preferable. Since the reflective type displays perform light display by using reflection (scattering) of outside light as paper does, the reflective type displays provide display quality close to that of paper. Further, in the reflective type displays, a backlight is not necessitated, and therefore power consumption is able to be kept low.

A major candidate of the reflective type displays is the electrophoretic display that generates lighting (contrast) by using an electrophoretic phenomenon, since power consumption is low and high-speed response is excellent in the electrophoretic display. Therefore, various discussions have been made for display methods of the electrophoretic display.

Specifically, a method of dispersing two types of charged particles each having different optical reflection characteristics and a different polarity in an insulating liquid, and moving the respective charged particles with the use of a polarity difference by an electric field has been proposed (for example, see Japanese Examined Patent Application Publication No. 50-015115 and Japanese Patent No. 4188091). In this method, since distribution of the two types of charged particles is changed according to the electric field, contrast is generated by using a difference of the optical reflection characteristics.

Further, a method of dispersing charged particles in an insulating liquid, arranging a porous layer having optical reflection characteristics different from those of the charged particles, and moving the charged particles through fine pores of the porous layer by an electric field has been proposed (for example, see Japanese Unexamined Patent Application Publication No. 2005-107146, Japanese Examined Patent Application Publication No. 50-015120, Japanese Unexamined Patent Application Publication No. 2005-128143, and Japanese Unexamined Patent Application Publication No. 2002-244163). As the porous layer, a polymer film in which fine pores are formed by a boring process by using a laser, a woven cloth made of synthetic fibers or the like, an open-cell porous polymer and the like are used. In this method, since distribution of the charged particles is changed according to the electric field, contrast is generated by using the difference of the optical reflection characteristics.

SUMMARY

Though various display methods of the electrophoretic display have been proposed, the display quality is not enough yet. In view of realizing color display, movie display, and the like in the future, it is necessary to further improve performance with regard to contrast and response speed. In this case, keeping the power consumption low is also important in order to use inherent advantages of the electrophoretic display.

It is desirable to provide an electrophoretic device, a display unit, and an electronic unit that are able to realize high contrast, high-speed response, and low power consumption.

According to an embodiment of the present technology, there is provided an electrophoretic device including an electrophoretic particle, a porous layer formed of a fibrous structure containing a non-electrophoretic particle having optical reflection characteristics different from optical reflection characteristics of the electrophoretic particle, and a pair of electrodes arranged with the porous layer in between. The porous layer is adjacent to one or both of the pair of electrodes.

According to an embodiment of the present technology, there is provided a display unit including an electrophoretic device between a pair of base substances, one or both of the pair of the base substances having light transmission characteristics. The electrophoretic device includes an electrophoretic particle, a porous layer formed of a fibrous structure containing a non-electrophoretic particle having optical reflection characteristics different from optical reflection characteristics of the electrophoretic particle, and a pair of electrodes arranged with the porous layer in between. The porous layer is adjacent to one or both of the pair of electrodes.

According to an embodiment of the present technology, there is provided an electronic unit including a display unit having an electrophoretic device between a pair of base substances, one or both of the pair of the base substances having light transmission characteristics. The electrophoretic device includes an electrophoretic particle, a porous layer formed of a fibrous structure containing a non-electrophoretic particle having optical reflection characteristics different from optical reflection characteristics of the electrophoretic particle, and a pair of electrodes arranged with the porous layer in between. The porous layer is adjacent to one or both of the pair of electrodes.

"Optical reflection characteristics" is what we call reflectance of light (outside light). The optical reflection characteristics of the non-electrophoretic particle are different from the optical reflection characteristics of the electrophoretic particle for the following reason. That is, by using the characteristics difference, contrast is generated.

According to the electrophoretic device, the display unit, or the electronic unit of the embodiments of the present technology, the porous layer is formed of the fibrous structure, and the fibrous structure contains the non-electrophoretic particle having optical reflection characteristics different from those of the electrophoretic particle. Further, the pair of electrodes are arranged with the porous layer in between, and the porous layer is adjacent to at least one of the pair of electrodes. Therefore, high contrast, high-speed response, and low power consumption are realized.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present technology, and are incorporated in and constitute a part of this specification. The drawings illustrate embodiments and, together with the specification, serve to explain the principles of the technology.

FIGS. 14A to 14G are a plan view illustrating a configuration of a mobile phone using the display unit.

DETAILED DESCRIPTION OF THE PREFERRED EMBODIMENT

An embodiment of the present technology will be hereinafter described in detail with reference to the drawings. The description will be given in the following order:
1. Configuration of Display Unit Using Electrophoretic Device
2. Method of Manufacturing Display Unit
3. Modifications
4. Application Examples of Display Unit (Electronic units)

[1. Configuration of Display Unit Using Electrophoretic Device]

Figure 1:
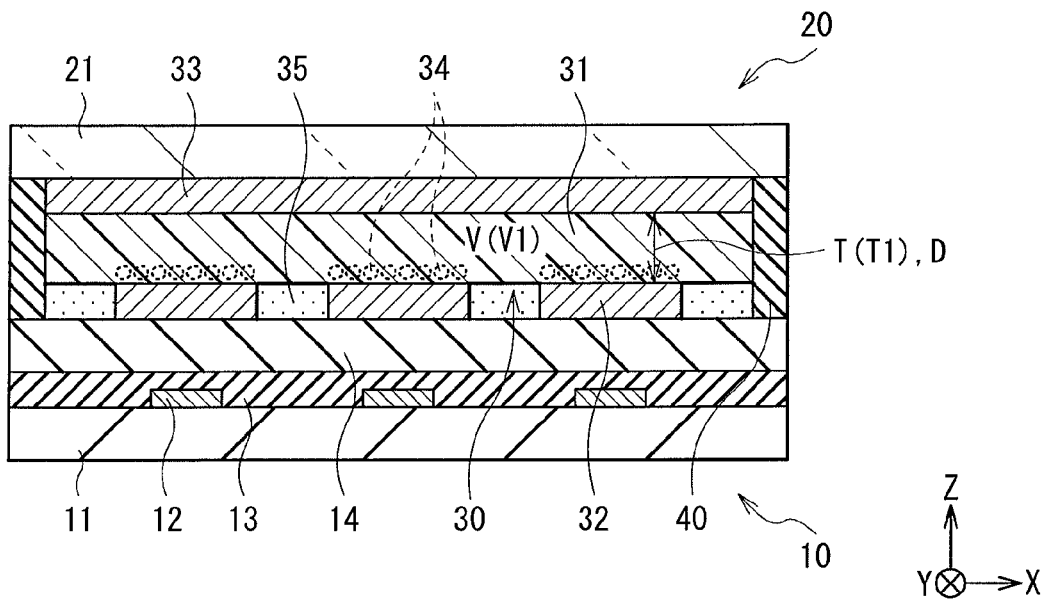
FIG. 1 is a cross-sectional view illustrating a configuration of a display unit using an electrophoretic device of an embodiment of the present technology.
Figure 2:
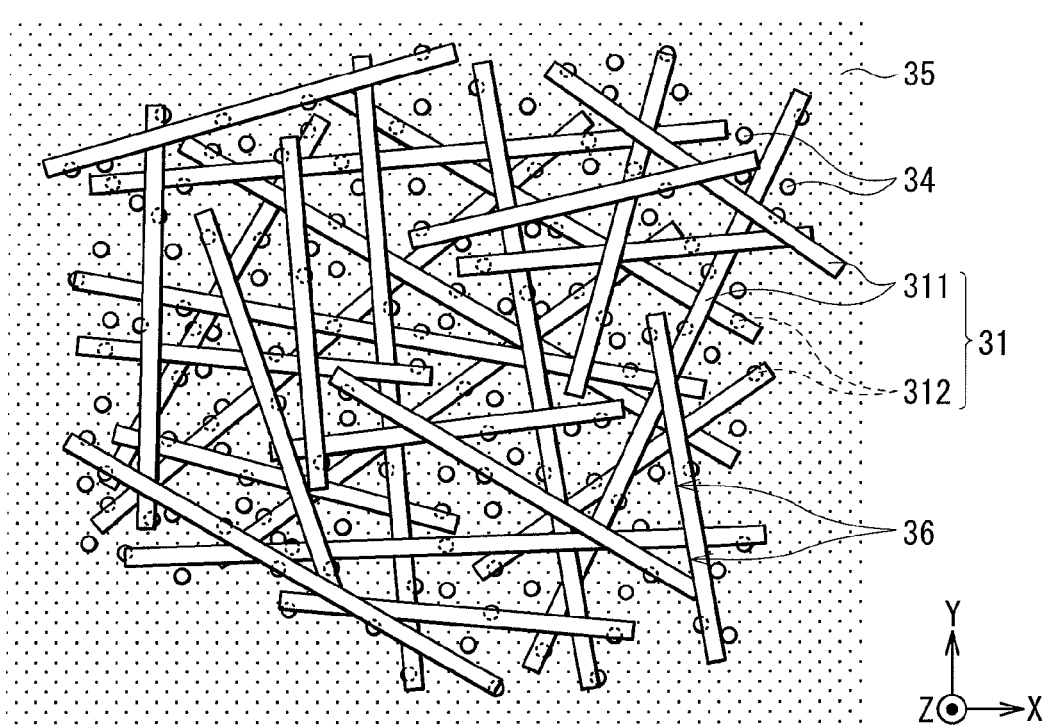
FIG. 2 is a plan view illustrating a configuration of a main section of the display unit.

First, a description will be given of a configuration of a display unit using an electrophoretic device of an embodiment of the present technology. FIG. 1 illustrates a cross sectional configuration of the display unit. FIG. 2 illustrates a plane configuration of a main section of the display unit illustrated in FIG. 1.

The electrophoretic device of the present technology is able to be applied to various applications such as display units, and the applications thereof are not particularly limited. A description will be hereinafter given of a case that the electrophoretic device is applied to the display unit. However, the configuration of the display unit is only an example, and is able to be changed as appropriate.

[Whole Configuration of Display Unit]

The display unit is an electrophoretic display for displaying an image (for example, textual information) by using an electrophoretic phenomenon, and is what we call an electronic paper display. In the display unit, for example, as illustrated in FIG. 1, a drive substrate 10 and an opposed substrate (display substrate) 20 are oppositely arranged with an electrophoretic device 30 and a spacer 40 in between. The display unit has a display face on the opposed substrate 20 side. "To have a display face on the opposed substrate 20 side" means that an image is displayed on the opposed substrate 20 side (users are able to view the image on the opposed substrate 20 side).

[Drive Substrate]

In the drive substrate 10, for example, a thin film transistor (TFT) 12, a protective layer 13, and a planarizing insulating layer 14 are formed in this order over one surface of a support base substance 11. In the drive substrate 10, for example, the TFT 12 is formed separately in a state of matrix or in a state of segment according to a pixel pattern or the like.

The support base substance 11 is formed of, for example, an inorganic material, a metal material, a plastic material, or the like. Examples of the inorganic material include silicon (Si), silicon oxide ($SiO_x$), silicon nitride ($SiN_x$), and aluminum oxide ($AlO_x$). Examples of the silicon oxide include glass and spin-on-glass (SOG). Examples of the metal material include aluminum (Al), nickel (Ni), and stainless steel. Examples of the plastic material include polycarbonate (PC), polyethylene terephthalate (PET), polyethylene naphthalate (PEN), and polyethyl ether ketone (PEEK).

The support base substance 11 can be light transmissive type or non-light transmissive type. Since an image is displayed on the opposed substrate 20 side, the support base substance 11 is not necessarily of the light transmissive type. Further, the support base substance 11 may be a substrate having rigidity such as a wafer, or may be a thin layer glass, a film, or the like having flexibility. Specially, the latter type is preferable, since, thereby, a flexible (bendable) display unit is realized.

The TFT 12 is a switching-use device for selecting a pixel. The TFT 12 can be an inorganic TFT using an inorganic semiconductor layer as a channel layer, or can be an organic TFT using an organic semiconductor layer. The protective layer 13 and the planarizing insulating layer 14 are formed from, for example, an insulating material such as polyimide. However, as long as the surface of the protective layer 13 is sufficiently flat, the planarizing insulating layer 14 may be omitted.

[Opposed Substrate]

The opposed substrate 20 is formed of a support base substance 21. The support base substance 21 may be provided with a member such as a color filter as appropriate.

The support base substance 21 is formed of the same material as that of the support base substance 11, except that the support base substance 21 is of the light transmissive type. Since an image is displayed on the opposed substrate 20 side, the support base substance 21 may have to be of the light transmissive type.

[Electrophoretic Device]

The electrophoretic device 30 includes a pair of electrodes (a pixel electrode 32 and a counter electrode 33) arranged with a porous layer 31 in between and an electrophoretic particle 34 contained between the pixel electrode 32 and the counter electrode 33. An insulating liquid 35 is filled in between the pixel electrode 32 and the counter electrode 33, and the electrophoretic particle 34 is dispersed in the insulating liquid 35.

[A Pair of Electrodes]

One of the pair of electrodes is, for example, the pixel electrode 32 formed on one surface of the drive substrate 10. The pixel electrode 32 is formed of, for example, a conductive material such as gold (Au), silver (Ag), copper (Cu), aluminum (Al), an aluminum alloy, and indium oxide-tin oxide (ITO). Further, the pixel electrode 32 may be entirely formed to cover the one surface of the drive substrate 10. Otherwise, the pixel electrode 32 may be formed separately in a state of matrix or in a state of segment according to a pixel arrangement pattern or the like. FIG. 1 illustrates a case that the pixel electrode 32 is formed separately according to the arrangement pattern of the TFT 12, for example. The pixel electrode 32 is connected to the TFT 12 through a contact hole (not illustrated) provided in the protective layer 13 and the planarizing insulating layer 14.

The other electrode of the pair of electrodes is, for example, the counter electrode 33 formed on one surface of the opposed substrate 20. The counter electrode 33 is formed of, for example, a light transmissive conductive material (transparent electrode material) such as indium oxide-tin oxide (ITO), antimony oxide-tin oxide (ATO), fluorine doped tin oxide (FTO), and aluminum doped zinc oxide (AZO). The counter electrode 33 may be formed entirely to cover the one surface of the opposed substrate 20. Otherwise, the counter electrode 33 may be formed separately in a state of matrix or in a state of segment as the pixel electrode 32 may be.

In the case where an image is displayed on the opposed substrate 20 side, a viewer views the display unit (electrophoretic device 30) through the counter electrode 33. Therefore, light transmission characteristics (light transmittance) of the counter electrode 33 are preferably high as much as possible, and are, for example, 80% or more. Further, electric resistance of the counter electrode 33 is preferably low as much as possible, and for example, equal to or smaller than 100 $\Omega/\square$.

[Electrophoretic Particles]

The electrophoretic particle 34 is one or more charged particles (electrophoretic particles) that are electrophoresed, and are able to be moved in the insulating liquid 35 toward the pixel electrode 32 or the counter electrode 33 according to an electric field. The electrophoretic particles 34 are, for example, particles (powder) formed of, for example, one or more materials of an organic pigment, an inorganic pigment, a dye, a carbon material, a metal material, a metal oxide, glass, and a polymer material (resin). Further, the electrophoretic particle 34 may be a crushed particle, a capsule particle, or the like of a resin solid content containing the foregoing particle. Materials corresponding to the carbon material, the metal material, the metal oxide, the glass, or the polymer material are excluded from materials corresponding to the organic pigment, the inorganic pigment, or the dye.

Examples of the organic pigment include an azo pigment, a metal complex azo pigment, a polycondensed azo pigment, a flavanthrone pigment, benzimidazolone pigment, a phthalocyanine pigment, a quinacridone pigment, an anthraquinone pigment, a perylene pigment, a perinone pigment, an anthrapyridine pigment, a piranthrone pigment, a dioxazine pigment, a thioindigo pigment, an isoindolinone pigment, a quinophthalone pigment, and an indanthrene pigment. Examples of the inorganic pigment include zinc oxide, antimony trioxide, carbon black, iron black, titanium boride, colcothar, mapico yellow, minium, cadmium yellow, zinc sulfide, lithopone, barium sulfide, cadmium selenide, calcium carbonate, barium sulfate, lead chromate, lead sulfate, barium carbonate, white lead, and alumina white. Examples of the dye include a nigrosine dye, an azo dye, a phthalocyanine dye, a quinophthalone dye, an anthraquinone dye, and a methine dye. Examples of the carbon material include carbon black. Examples of the metal material include gold, silver, and copper. Examples of the metal oxide include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material include a polymer compound in which a functional group having a light absorption region in a visible light region is introduced. As long as a polymer compound having the light absorption region in the visible light region is used, the type thereof is not particularly limited.

The content (concentration) of the electrophoretic particle 34 in the insulating liquid 35 is not particularly limited, and is, for example, from 0.1 wt % to 10 wt % both inclusive, since thereby shielding (concealing) characteristics and mobility of the electrophoretic particle 34 are secured. In this case, if the content (concentration) of the electrophoretic particle 34 in the insulating liquid 35 is smaller than 0.1 wt %, the electrophoretic particle 34 may be less likely to shield the porous layer 31. Meanwhile, if the content (concentration) of the electrophoretic particle 34 in the insulating liquid 35 is larger than 10 wt %, dispersibility of the electrophoretic particle 34 is lowered and therefore the electrophoretic particle 34 may be less likely to be electrophoresed, and may be aggregated in some cases.

The electrophoretic particle 34 has given optical reflection characteristics (light reflectance). Though the light reflectance of the electrophoretic particle 34 is not particularly limited, the light reflectance of the electrophoretic particle 34 is preferably set to at least a value at which the electrophoretic particle 34 is able to shield the porous layer 31 for the following reason. That is, by using a difference between the light reflectance of the electrophoretic particle 34 and the light reflectance of the porous layer 31, contrast is generated.

Specific formation materials of the electrophoretic particle 34 are selected according to a role undertaken by the electrophoretic particle 34 to generate contrast, for example. Specifically, a material in the case of performing light display by the electrophoretic particle 34 is, for example, a metal oxide such as titanium oxide, zinc oxide, zirconium oxide, barium titanate, and potassium titanate. Specially, titanium oxide is preferable, since titanium oxide has excellent electrochemical stability and excellent dispersibility, and provides high reflectance. Meanwhile, a material in the case of performing dark display by the electrophoretic particle 34 is, for example, a carbon material, a metal oxide, or the like. Examples of the carbon material include carbon black. Examples of the metal oxide include copper-chromium oxide, copper-manganese oxide, copper-iron-manganese oxide, copper-chromium-manganese oxide, and copper-iron-chromium oxide. Specially, the carbon material is preferable, since thereby excellent chemical stability, excellent mobility, and excellent light absorbability are obtained.

In the case of performing light display by the electrophoretic particle 34, a color of the electrophoretic particle 34 viewed from outside is not particularly limited, as long as contrast is thereby generated. However, specially, the color of the electrophoretic particle 34 viewed from outside is preferably a color close to white, and is more preferably white. Meanwhile, in the case of performing dark display by the electrophoretic particle 34, the color of the electrophoretic particle 34 viewed from outside is not particularly limited, as long as contrasting is thereby generated. However, specially, the color of the electrophoretic particle 34 viewed from outside is preferably a color close to black, and is more preferably black. In both cases, high contrast is obtained.

It is preferable that the electrophoretic particle 34 be easily dispersed and be easily charged in the insulating liquid 35 for a long time, and be less likely to be absorbed into the porous layer 31. Therefore, a disperser (or a charge adjuster) may be used in order to disperse the electrophoretic particle 34 by electrostatic repulsion, the electrophoretic particle 34 may be provided with surface treatment, or both the foregoing methods may be used.

Examples of the disperser include Solsperse series made by Lubrizol Co., BYK series or Anti-Terra series made by BYK-Chemie Co., and Span series made by ICI Americas Co.

Examples of the surface treatment include rosin treatment, surfactant treatment, pigment derivative treatment, coupling agent treatment, graft polymerization treatment, and microcapsulation treatment. Specially, graft polymerization treatment, microcapsulation treatment, or combination thereof is preferable, since, thereby, dispersion stability and the like are obtained for a long time.

Examples of a material for the surface treatment include a material having a functional group and a polymerizable functional group capable of being absorbed into the surface of the electrophoretic particle 34 (absorptive material). An absorbable functional group type is determined according to the formation material of the electrophoretic particle 34. Examples thereof include an aniline derivative such as 4-vinylaniline for a carbon material such as carbon black and an organosilane derivative such as methacrylic acid 3-(trimethoxysilyl)propyl for a metal oxide. Examples of the polymerizable functional group include a vinyl group, an acryl group, and a methacryl group.

Further, examples of a material for the surface treatment include a material capable of being grafted into the surface of the electrophoretic particle 34 to which a polymerizable functional group is introduced (graft material). The graft material preferably has a polymerizable functional group and a dispersion functional group capable of being dispersed in the insulating liquid 35 and capable of retaining dispersibility by steric barrier. A type of material for polymerizable functional is similar to that described for the absorptive material. Examples of the dispersion functional group include a branch-like alkyl group in the case where the insulating liquid 35 is paraffin. To polymerize or graft the graft material, for example, a polymerization initiator such as azobisisobutyronitrile (AIBN) may be used.

For reference, for details of the method of dispersing the electrophoretic particle 34 in the insulating liquid 35 as described above, descriptions are given in books such as "Dispersion Technology of Superfine Particle and Evaluation thereof: Surface Treatment, Pulverizing, and Dispersion Stabilization in Air/Liquid/Polymer" published by Science & Technology Co.

[Porous Layer]

As illustrated in FIG. 2, the porous layer 31 is a three-dimensional space structure (irregular network structure such as a non-woven cloth) formed of a fibrous structure 311, and may be supported by the spacer 40. The porous layer 31 has a plurality of gaps (fine pores 36) through which the electrophoretic particle 34 is moved in a location where the fibrous structure 311 does not exist. It is to be noted that in FIG. 1, the configuration of the porous layer 31 is simplified.

The fibrous structure 311 contains one or more non-electrophoretic particles 312. The non-electrophoretic particle 312 is supported by the fibrous structure 311. In the porous layer 31 as the three-dimensional space structure, one fibrous structure 311 may intertwine at random, a plurality of fibrous structures 311 may assemble and be layered at random, or both the foregoing states may exist at once. In the case where a plurality of fibrous structures 311 exist, the respective fibrous structures 311 preferably support one or more non-electrophoretic particles 312. It is to be noted that FIG. 2 illustrates a case that the porous layer 31 is formed of a plurality of fibrous structures 311.

The porous layer 31 is the three-dimensional space structure formed of the fibrous structure 311 for the following reason. Due to the irregular space structure, outside light is easily reflected diffusely (multiple scattering). Therefore, the light reflectance of the porous layer 31 is increased, and such high light reflectance leads to the thin porous layer 31. Accordingly, contrast is increased, and energy necessary to move the electrophoretic particle 34 is decreased. Further, since the average pore diameter of the fine pore 36 is increased, and the number thereof is increased, the electrophoretic particle 34 easily moves through the fine pore 36. Thereby, time necessary to move the electrophoretic particle 34 is decreased, and energy necessary to move the electrophoretic particle 34 is decreased.

The fibrous structure 311 contains the non-electrophoretic particle 312 for the following reason. That is, since outside light is more easily reflected diffusely, the light reflectance of the porous layer 31 is more increased. Thereby, contrast is more increased.

The fibrous structure 311 is a fibrous material having a sufficiently large length to the fiber diameter (diameter). The fibrous structure 311 is, for example, formed from one or more of a polymer material, an inorganic material, and the like, and may be formed from other material. Examples of the polymer material include nylon, polyactic acid, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinyl pyrrolidone, polyvinylidene fluoride, polyhexafluoropropylene, acetylcellulose, collagen, gelatin, chitosan, and copolymers thereof. Examples of the inorganic material include titanium oxide. Specially, as a formation material of the fibrous structure 311, the polymer material is preferable. Since the polymer material has low reactivity (photoreactivity or the like) (that is, is chemically stable), unintended decomposition reaction of the fibrous structure 311 is thereby inhibited. In the case where the fibrous structure 311 is formed from a material with high reactivity, the surface of the fibrous structure 311 is preferably covered with a given protective layer.

The shape (appearance) of the fibrous structure 311 is not particularly limited as long as the fibrous structure 311 is a fiber having a sufficiently large length to the fiber diameter as described above. Specifically, the shape (appearance) of the fibrous structure 311 may be linear, may be curly, or may be bent on the way. Further, the fibrous structure 311 is not necessarily extended in one direction, and may be branched in one or more directions on the way. A method of forming the fibrous structure 311 is not particularly limited. The method of forming the fibrous structure 311 is preferably, for example, a phase separation method, a phase reverse method, an electrostatic (electric field) spinning method, a melt spinning method, a wet spinning method, a dry spinning method, a gel spinning method, a sol gel method, a spray coating method, or the like, since a fiber material having a sufficiently large length to the fiber diameter is easily and stably formed by the foregoing methods.

Though the average fiber diameter of the fibrous structure 311 is not particularly limited, the average fiber diameter of the fibrous structure 311 is preferably small as much as possible for the following reason. That is, light becomes easily reflected diffusely, and the average pore diameter of the fine pore 36 becomes larger. However, it may be necessary to determine the average fiber diameter so that the fibrous structure 311 is able to support the non-electrophoretic particle 312. Therefore, the average fiber diameter of the fibrous structure 311 is preferably 10 μm or less. The lower limit of the average fiber diameter is not particularly limited, is, for example, 0.1 µm, and may be smaller than 0.1 µm. The average fiber diameter is measured by microscope observation with the use of a scanning electron microscope (SEM) or the like. The average length of the fibrous structure 311 may be set as appropriate.

The average pore diameter of the fine pore 36 is not particularly limited. Specially, the average pore diameter of the fine pore 36 is preferably large as much as possible, since thereby the electrophoretic particle 34 easily moves through the fine pore 36. Therefore, the average pore diameter of the fine pore 36 is preferably from 0.1 µm to 10 µm both inclusive.

The thickness of the porous layer 31 is not particularly limited, and is, for example, from 5 µm to 100 µm both inclusive, since thereby shielding characteristics of the porous layer 31 are increased, and the electrophoretic particle 34 easily moves through the fine pore 36.

In particular, the fibrous structure 311 is preferably a nanofiber. In the case where the nanofiber is used as the fibrous structure 311, the space structure becomes complicated and outside light is easily reflected diffusely, and therefore the light reflectance of the porous layer 31 is more increased. In addition, in the case where the nanofiber is used as the fibrous structure 311, the occupying volume ratio of the fine pore 36 in a unit volume of the porous layer 31 is increased, and therefore the electrophoretic particle 34 easily moves through the fine pore 36. Thereby, contrast is more increased, and the energy necessary to move the electrophoretic particle 34 is more decreased. The nanofiber is a fibrous material having a fiber diameter being from 0.001 µm to 0.1 µm both inclusive and having a length being 100 times or more as long as the fiber diameter. The fibrous structure 311 as the nanofiber is preferably formed by an electrostatic spinning method with the use of a polymer material, since thereby the fibrous structure 311 having a small fiber diameter is easily and stably formed.

The fibrous structure 311 preferably has optical reflection characteristics different from those of the electrophoretic particle 34. Specifically, though the light reflectance of the fibrous structure 311 is not particularly limited, the light reflectance of the fibrous structure 311 is preferably set at least so that the porous layer 31 is able to shield the electrophoretic particle 34 as a whole for the following reason. That is, as described above, by using the difference between the light reflectance of the electrophoretic particle 34 and the light reflectance of the porous layer 31, contrast is generated. Accordingly, the fibrous structure 311 having light transparency (transparent and colorless characteristics) in the insulating liquid 35 is not preferable. However, in the case where the light reflectance of the fibrous structure 311 is less likely to affect the light reflectance of the entire porous layer 31, and the light reflectance of the entire porous layer 31 is practically determined by the light reflectance of the non-electrophoretic particles 312, the light reflectance of the fibrous structure 311 may beset as appropriate.

The non-electrophoretic particle 312 is fixed to the fibrous structure 311, and is a particle that is not electrophoresed. A formation material of the non-electrophoretic particle 312 is, for example, similar to the formation material of the electrophoretic particle 34, and is selected according to a role undertaken by the non-electrophoretic particle 312 as described later.

The non-electrophoretic particle 312 may be partially exposed from the fibrous structure 311, or may be buried inside thereof, as long as the non-electrophoretic particle 312 is supported by the fibrous structure 311.

The non-electrophoretic particle 312 has optical reflection characteristics different from those of the electrophoretic particle 34. Though the light reflectance of the non-electrophoretic particle 312 is not particularly limited, the light reflectance of the non-electrophoretic particle 312 is preferably set at least so that the porous layer 31 is able to shield the electrophoretic particle 34 as a whole for the following reason. That is, as described above, by using the difference between the light reflectance of the electrophoretic particle 34 and the light reflectance of the porous layer 31, contrast is generated.

A specific formation material of the non-electrophoretic particle 312 is, for example, selected according to the role undertaken by the non-electrophoretic particle 312 for generating contrast. Specifically, a material in the case of performing light display by the non-electrophoretic particle 312 is similar to the material of the electrophoretic particle 34 selected in the case of performing light display. Meanwhile, a material in the case of performing dark display by the non-electrophoretic particle 312 is similar to the material of the electrophoretic particle 34 selected in the case of performing dark display. Specially, as the material selected in the case of performing light display by the non-electrophoretic particle 312, a metal oxide is preferable, and titanium oxide is more preferable, since thereby excellent electrochemical stability, excellent fixing characteristics, and high reflectance are obtained. The formation material of the non-electrophoretic particle 312 may be of the same type as that of the formation material of the electrophoretic particle 34 and may be of a different type from that of the formation material of the electrophoretic particle 34, as long as contrasting is thereby generated.

A color viewed in the case of performing light display or dark display by the non-electrophoretic particle 312 is similar to the case described for the viewed color of the electrophoretic particle 34.

The occupying ratio of the non-electrophoretic particle 312 in the entire porous layer 31 (volume fraction V1) is not particularly limited. However, specially, the occupying ratio of the non-electrophoretic particle 312 in the entire porous layer 31 is preferably from 2 wt % to 10 wt % both inclusive, since abundance of the non-electrophoretic particle 312 in a unit volume of the porous layer 31 is thereby secured. Accordingly, while physical strength or the like of the porous layer 31 is secured, high reflectance is obtained by using diffuse reflection of light in the fibrous structure 311 and the non-electrophoretic particle 312.

A calculation procedure of the volume fraction V1 is, for example, as follows. First, the porous layer 31 is observed by an SEM, a confocal laser scanning microscope or the like, and the thickness of the porous layer 31 (fibrous structure 311) is measured. Subsequently, the non-electrophoretic particle 312 is observed by an SEM or the like, and the average particle diameter of the non-electrophoretic particle 312 is measured. Subsequently, the porous layer 31 is observed by an SEM or the like, and the occupying area ratio of the non-electrophoretic particle 312 in a unit area of the porous layer 31 is measured. Finally, based on the foregoing measurement results, the volume fraction V1(%)=(volume of the non-electrophoretic particle 312/volume of the porous layer 31)*100 is calculated.

Further, the refractive index and the average particle diameter of the non-electrophoretic particle 312 are not particularly limited. Specially, the refractive index is preferably high as much as possible, and specifically, is more preferably equal to or greater than 2, since, thereby, the reflectance of the porous layer 31 is increased. Further, the average particle diameter is preferably from 200 nm to 1000 nm both inclusive for the following reason. That is, in this case, while the non-electrophoretic particle 312 is supported by the fibrous structure 311, high reflectance is obtained by using the diffuse reflection of light in the fibrous structure 311 and the non-electrophoretic particle 312. The average particle diameter is a value measured by using a Zeta electric potential/particle diameter measurement system ELSZ-2 (available from Otsuka Electronics Co., Ltd.).

An example of a formation procedure of the porous layer 31 is as follows. First, a formation material of the fibrous structure 311 (for example, a polymer material or the like) is dispersed or dissolved in an organic solvent or the like to prepare a spinning solution. Subsequently, after the non-electrophoretic particle 312 is added to the spinning solution, the resultant is sufficiently stirred to disperse the non-electrophoretic particle 312 in the spinning solution. Finally, spinning is performed by an electrostatic spinning method with the use of the spinning solution. Thereby, since the non-electrophoretic particle 312 is supported by the fibrous structure 311, the porous layer 31 is formed.

In particular, the porous layer 31 is adjacent to (is contacted with) at least one of the pixel electrode 32 and the counter electrode 33. In this case, for example, as illustrated in FIG. 1, the porous layer 31 is adjacent to both the pixel electrode 32 and the counter electrode 33. Thereby, distance (interelectrode distance) D between the pixel electrode 32 and the counter electrode 33 is equal to thickness T (T1) of the porous layer 31.

The porous layer 31 is adjacent to the pixel electrode 32 for the following reason. Similarly, the porous layer 31 is adjacent to the counter electrode 33 for the following reason.

Firstly, in this case, since no gap exists between the porous layer 31 and the pixel electrode 32, the electrophoretic particle 34 is inhibited from being unintentionally moved from an inherent location to another location through such a gap. "Inherent location" means a location where the electrophoretic particle 34 should inherently exist for generating contrast in the display region (a pixel or the like). Meanwhile, "another location" means a location other than the inherent location (an adjacent pixel or the like). Thereby, apparent light reflectance is inhibited from being lowered resulting from unintended movement of the electrophoretic particle 34, and therefore contrast is improved. "Apparent light reflectance" means, for example, light reflectance (white reflectance) determining contrast in a light-display state in a non-display state of an image (light-display state of all pixels), in the case where dark display is performed by the electrophoretic particle 34 and light display is performed by the porous layer 31.

In particular, in the case where an electric field is continuously applied between the pixel electrode 32 and the counter electrode 33, contrast tends to be easily lowered resulting from the unintended movement of the electrophoretic particle 34. Therefore, in the case where the porous layer 31 is adjacent to the pixel electrode 32, contrast is easily maintained even if an image is continuously displayed, compared to in a case that the porous layer 31 is not adjacent to the pixel electrode 32.

Even if the porous layer 31 is adjacent to the pixel electrode 32, there is a possibility that, in the porous layer 31, the electrophoretic particle 34 is unintentionally moved to the adjacent pixel or the like through the fine pore 36. However, possibility that the electrophoretic particle 34 is unintentionally moved to the adjacent pixel or the like is remarkably decreased more in the case that the porous layer 31 is adjacent to the pixel electrode 32 than in the case that the porous layer 31 is not adjacent to the pixel electrode 32. Therefore, in the case where the porous layer 31 is adjacent to the pixel electrode 32, contrast is more improved than in the case that the porous layer 31 is not adjacent to the pixel electrode 32.

Secondly, in the case where the porous layer 31 is adjacent to the pixel electrode 32, the interelectrode distance D becomes smaller than that in the case that the porous layer 31 is not adjacent to the pixel electrode 32. Thereby, movement distance of the electrophoretic particle 34 at the time of switching between light display and dark display is decreased, and the energy necessary to move the electrophoretic particle 34 is decreased.

Thirdly, since the porous layer 31 is sandwiched between the pixel electrode 32 and the counter electrode 33, a position of the porous layer 31 is fixed. Thereby, even if the display unit is used for a long time, the porous layer 31 is less likely to be deformed (for example, to be bent), and position relation between the porous layer 31, and the electrophoretic particle 34, the pixel electrode 32, the counter electrode 33, or the like is less likely to be changed. Therefore, high contrast is obtained stably for a long time.

It is enough that the porous layer 31 is adjacent to at least part of the pixel electrode 32, since thereby the foregoing series of advantages are obtained in such a location where the porous layer 31 is adjacent to the pixel electrode 32. For a similar reason, it is enough that the porous layer 31 is adjacent to at least part of the counter electrode 33.

[Insulating Liquid]

The insulating liquid 35 is, for example, one or more of nonaqueous solvents such as an organic solvent, and is specifically paraffin, isoparaffin, or the like. A viscosity and a refractive index of the insulating liquid 35 are preferably small as much as possible, since thereby mobility (response speed) of the electrophoretic particle 34 is improved, and, accordingly, the energy (power consumption) necessary to move the electrophoretic particle 34 is decreased. Further, since the difference between the refractive index of the insulating liquid 35 and the refractive index of the porous layer 31 is increased, the light reflectance of the porous layer 31 is increased as well.

The insulating liquid 35 may contain various materials as appropriate. Examples of the various materials include a colorant, a charge control agent, a dispersion stabilizer, a viscosity modifier, an interfacial active agent, and a resin.

[Preferable Display Method of Electrophoretic Device]

In the electrophoretic device 30, as described above, contrast is generated by using the difference between the light reflectance of the electrophoretic particle 34 and the light reflectance of the porous layer 31 (the fibrous structure 311 containing the non-electrophoretic particle 312). In this case, it is possible that light display is performed by the electrophoretic particle 34 and dark display is performed by the porous layer 31, or vice versa. Such a difference of roles is determined by magnitude correlation between the light reflectance of the electrophoretic particle 34 and the light reflectance of the porous layer 31. That is, the light reflectance of light display is set to a higher value than the light reflectance of dark display.

Specially, it is preferable that dark display be performed by the electrophoretic particle 34 and light display be performed by the porous layer 31. Accordingly, in the case where the light reflectance of the porous layer 31 is practically determined by the light reflectance of the non-electrophoretic particle 312, the light reflectance of the non-electrophoretic particle 312 is preferably higher than the light reflectance of the electrophoretic particle 34. The light reflectance of light display in this case is remarkably increased by using the diffuse reflection of outside light by the porous layer 31, and therefore, contrast is remarkably increased accordingly.

[Spacer]

The spacer 40 is formed of, for example, an insulating material such as a polymer material. However, the configuration of the spacer 40 is not particularly limited, and may be composed of a sealing material in which fine particles are mixed or the like.

A shape of the spacer 40 is not particularly limited. Specially, the shape of the spacer 40 is preferably a shape that does not prevent the movement of the electrophoretic particle 34 and is able to uniformly distribute the electrophoretic particle 34. For example, the shape of the spacer 40 is a lattice-like shape. Further, the thickness of the spacer 40 is not particularly limited. Specially, the thickness of the spacer 40 is preferably small as much as possible in order to decrease power consumption, and is, for example, from 10 μm to 100 μm both inclusive. It is to be noted that FIG. 1 illustrates a simplified configuration of the spacer 40.

[Operation of Display Unit]

Figure 3:
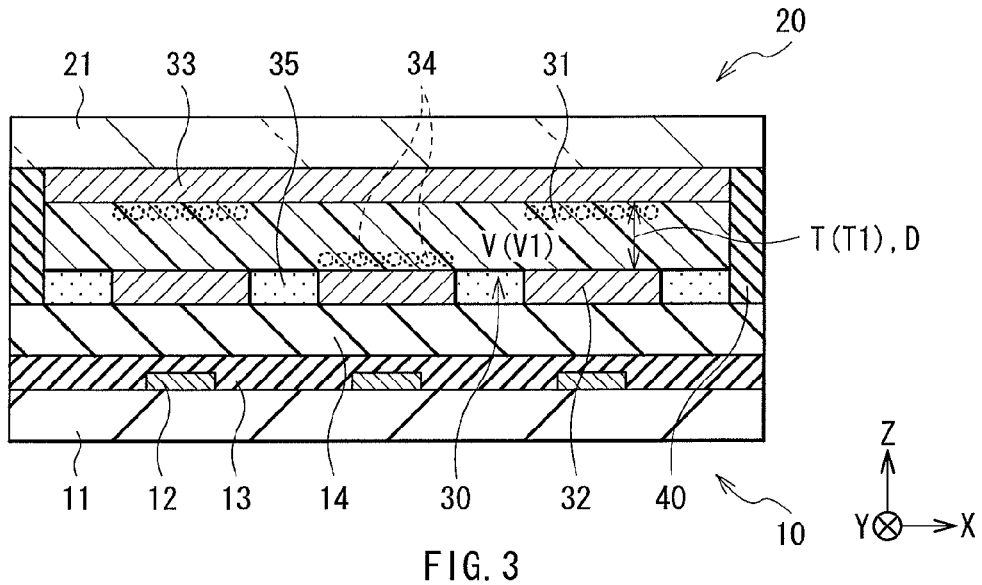
FIG. 3 is a cross-sectional view for explaining operation of the display unit.

The display unit is operated as below. FIG. 3 is intended to explain operation of the display unit, and illustrates a cross sectional configuration corresponding to FIG. 1.

A description will be given of a case that dark display is performed by the electrophoretic particle 34 and light display is performed by the porous layer 31 because the light reflectance of the electrophoretic particle 34 is smaller than the light reflectance of the porous layer 31 (the fibrous structure 311 and the non-electrophoretic particle 312).

In the initial state, as illustrated in FIG. 1, in all pixels, the electrophoretic particles 34 are located on the side close to the pixel electrode 32 in the insulating liquid 35. In this case, if the display unit is viewed from the display surface side, the electrophoretic particles 34 are shielded by the porous layer 31 in all pixels (light display is performed), and therefore contrasting is not generated (an image is not displayed).

In the case where a pixel is selected by the TFT 12 and an electric field is applied between the pixel electrode 32 and the counter electrode 33, as illustrated in FIG. 2 and FIG. 3, in the pixel to which the electric field is applied, the electrophoretic particles 34 are moved toward the counter electrode 33 thorough the fine pore 36 of the porous layer 31. In this case, if the display unit is viewed from the display surface side, pixels in which the electrophoretic particles 34 are shielded by the porous layer 31 (light display is performed) and pixels in which the electrophoretic particles 34 are not shielded by the porous layer 31 (dark display is performed) coexist, and therefore contrast is generated by using display color difference. As above, since display color (light and dark display) is switched for every pixel, an image is displayed by using entire contrast.

[2. Method of Manufacturing Display Unit]

Figure 4:
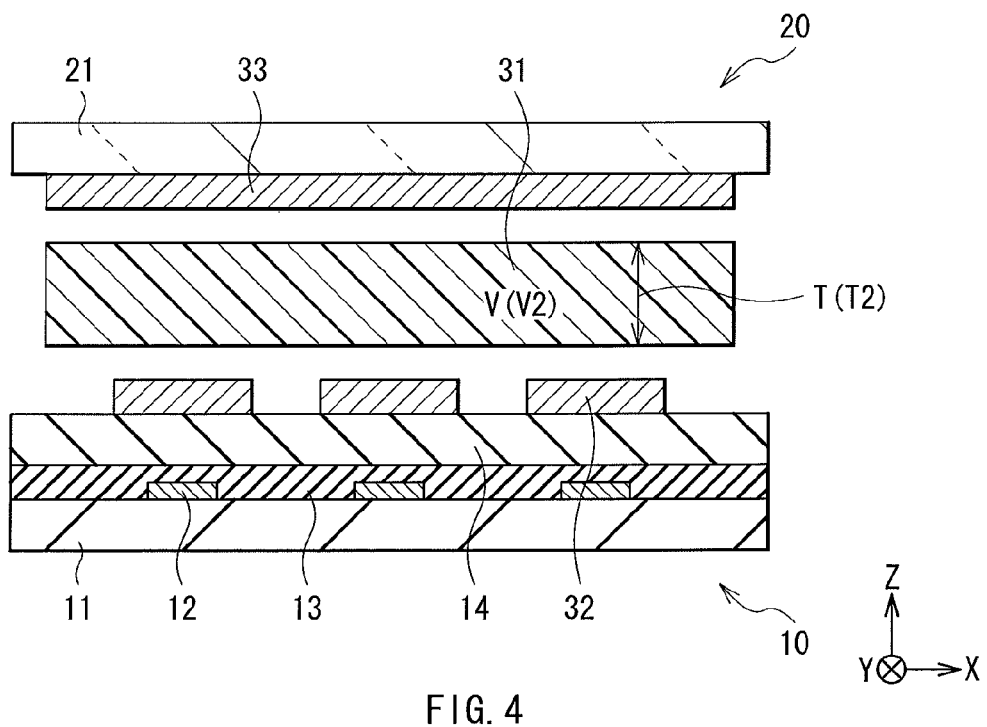
FIG. 4 is a cross-sectional view for explaining a method of manufacturing the display unit.
Figure 5:
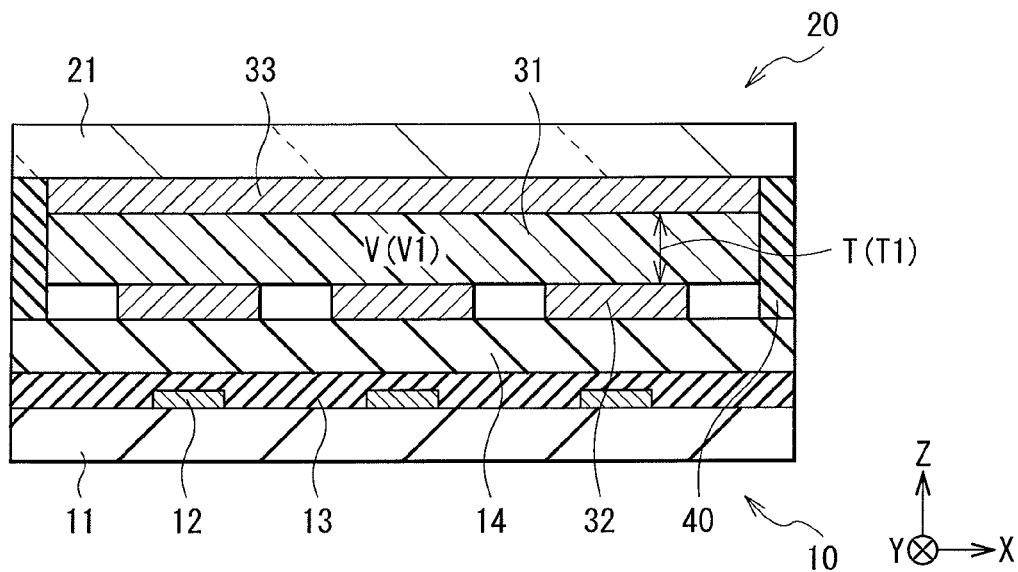
FIG. 5 is a cross-sectional view for explaining a step following a step in FIG. 4.

Next, a description will be given of a method of manufacturing a display unit. FIG. 4 and FIG. 5 are intended to explain the method of manufacturing a display unit, and illustrate a cross sectional configuration corresponding to the configuration shown in FIG. 1.

First, as illustrated in FIG. 4, the TFT 12, the protective layer 13, and the planarizing insulating layer 14 are formed in this order over one surface of the support base substance 11 to form the drive substrate 10. After that, the pixel electrode 32 is formed on one surface of the drive substrate 10. Further, after the opposed substrate 20 formed of the support base substance 21 is prepared, the counter electrode 33 is formed on one surface of the opposed substrate 20. As a method of forming the respective elements, for example, existing formation methods can be selected and used as needed.

Subsequently, the porous layer 31 (the fibrous structure 311 containing the non-electrophoretic particle 312) is formed by the foregoing procedure. In this case, for example, the thickness T of the porous layer 31 is set to T2 larger than the final thickness T1 (the thickness after completion of the display unit), and the volume fraction V of the porous layer 31 is set to V2 smaller than the final volume fraction V1.

In FIG. 4, to clearly show the position relation between the porous layer 31, and the pixel electrode 32 and the counter electrode 33, a state that the porous layer 31 is separated from both the pixel electrode 32 and the counter electrode 33. However, in the case where the porous layer 31 is formed by using one of the drive substrate 10 and the opposed substrate 20 as a support base (supporting substrate) by an electrostatic spinning method or the like, the porous layer 31 may be previously adjacent to one of the drive substrate 10 and the opposed substrate 20.

Subsequently, as illustrated in FIG. 5, the drive substrate 10 and the opposed substrate 20 are oppositely arranged with the porous layer 31 and the spacer 40 in between. In this case, the porous layer 31 is sandwiched between the pixel electrode 32 and the counter electrode 33, and the porous layer 31, thereby, becomes adjacent to both the pixel electrode 32 and the counter electrode 33. In particular, the porous layer 31 is preferably compressed by the pixel electrode 32 and the counter electrode 33 from the upper and the lower sides for the following reason. That is, the filling density of the non-electrophoretic particles 312 is increased in the porous layer 31, and therefore the volume fraction V is changed to V1 larger than V2. Accordingly, the thickness T of the porous layer 31 is changed to T1 smaller than T2.

Finally, the insulating liquid 35 in which the electrophoretic particle 34 is dispersed is filled between the drive substrate 10 and the counter substrate 20. Thereby, the display unit illustrated in FIG. 1 is completed.

[Function and Effect of Display Unit]

According to the display unit, the porous layer 31 is formed of the fibrous structure 311, and the fibrous structure 311 contains the non-electrophoretic particle 312 having the optical reflection characteristics different from those of the electrophoretic particle 34. Further, the pixel electrode 32 and the counter electrode 33 are arranged with the porous layer 31 in between. The porous layer 31 is adjacent to both the pixel electrode 32 and the counter electrode 33. Therefore, high contrast, high-speed response, and low power consumption are realized for the following reason.

Figure 6:
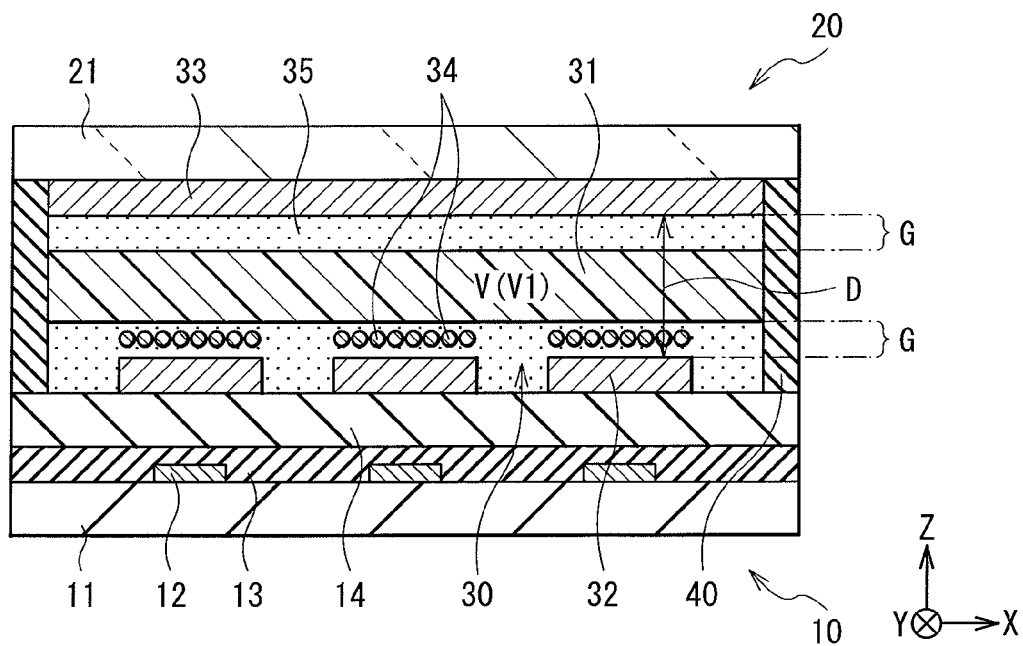
FIG. 6 is a cross-sectional view illustrating a configuration of a display unit of a comparative example.

FIG. 6 illustrates a configuration of a display unit of a comparative example, and illustrates a cross sectional configuration corresponding to the configuration in FIG. 1. The display unit of the comparative example has a similar configuration to that of the display unit according to the embodiment of the present technology (FIG. 1), except that the porous layer 31 is separated from both the pixel electrode 32 and the counter electrode 33.

In the comparative example (FIG. 6), a gap G is generated between the porous layer 31, and the pixel electrode 32 and the counter electrode 33. In this case, as described above, especially in the case where an electric field is continuously applied between the pixel electrode 32 and the counter electrode 33, contrast is lowered resulting from the unintended movement of the electrophoretic particle 34 to an adjacent pixel or the like through the gap G. In addition, since the interelectrode distance D (=movement distance of the electrophoretic particle 34) becomes larger by an amount of the gap G, the time necessary to move the electrophoretic particle 34 is increased, and the energy necessary to move the electrophoretic particle 34 is increased as well. Further, due to existence of the gap G, the porous layer 31 is easily deformed if a long time elapses, for example, and therefore contrast is unstable.

Meanwhile, according to the embodiment of the present technology (FIG. 1), the gap G is not generated between the porous layer 31, and the pixel electrode 32 and the counter electrode 33. Thereby, as described above, even if the electric field is continuously applied between the pixel electrode 32 and the counter electrode 33, contrast is inhibited from being lowered since the electrophoretic particle 34 is less likely to move to the adjacent pixel or the like. In addition, since the interelectrode distance D is decreased and deformation or the like of the porous layer 31 is less likely to be generated, the time necessary to move the electrophoretic particle 34 is decreased, and the energy necessary to move the electrophoretic particle 34 is decreased as well. Further, contrast becomes stable.

Further, according to the embodiment of the present technology, the porous layer 31 is formed from the fibrous structure 311 containing the non-electrophoretic particle 312. Therefore, while the porous layer 31 has the sufficient number of fine pores 36 having sufficient size, outside light is easily reflected diffusely even if the porous layer 31 is thin. Thereby, the light reflectance of the porous layer 31 is increased, the electrophoretic particle 34 easily moves through the fine pore 36, and the time necessary for such movement is more decreased.

Therefore, according to the embodiment of the present technology, high contrasting, high-speed response, and low power consumption are realized. Thereby, a high quality image is displayed with low power consumption.

In particular, in the case where the porous layer 31 is compressed at the time of manufacturing the display unit, the occupying ratio of the non-electrophoretic particle 312 in the entire porous layer 31 (volume fraction V) is increased, and therefore higher effect is obtained. Specifically, the volume fraction V is preferably from 2 wt % to 10 wt % both inclusive. Further, in the case where the refractive index of the non-electrophoretic particle 312 is 2 or more, and the average particle diameter thereof is from 200 nm to 1000 nm both inclusive, a higher effect is obtained.

Further, in the case where the fibrous structure 311 is formed by electrostatic spinning method or the fibrous structure 311 is a nanofiber having an average fiber diameter equal to or smaller than 10 μm, a space structure capable of more increasing diffuse reflection characteristics of outside light is easily formed of the fibrous structure 311. Further, the size of the fine pore 36 is more increased, and the number thereof is more increased. Therefore, a higher effect is obtained. In particular, since the light reflectance of the non-electrophoretic particles 312 is higher than the light reflectance of the electrophoretic particle 34, if dark display is performed by the electrophoretic particle 34 and light display is performed by the porous layer 31, the light reflectance of the porous layer 31 is remarkably increased by using diffuse reflection of outside light. Therefore, a still higher effect is able to be obtained.

[3. Modifications]

Figure 7:
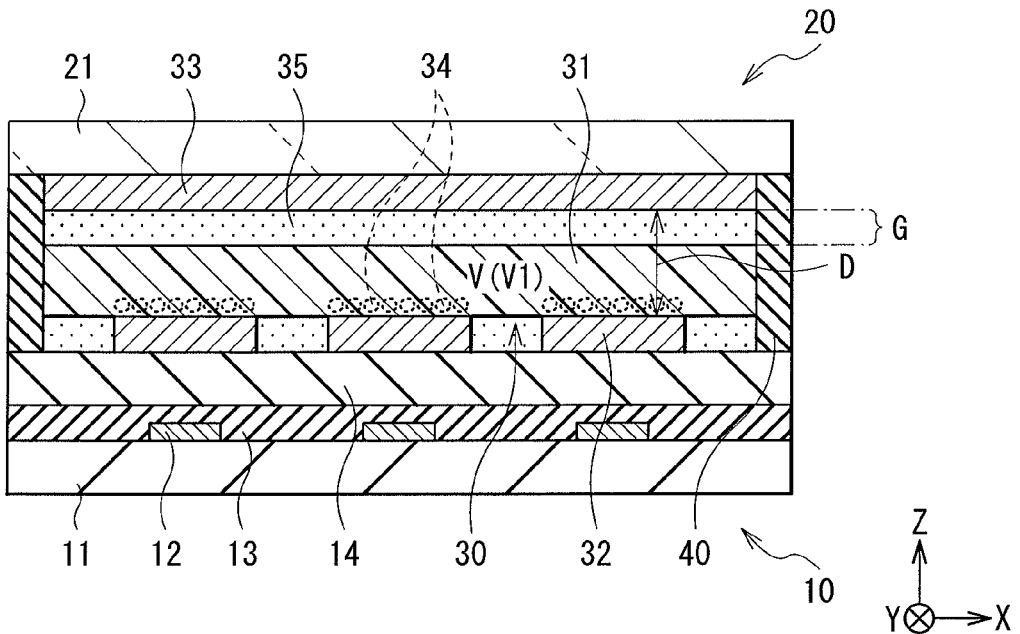
FIG. 7 is a cross-sectional view illustrating a modification of the configuration of the display unit.
Figure 8:
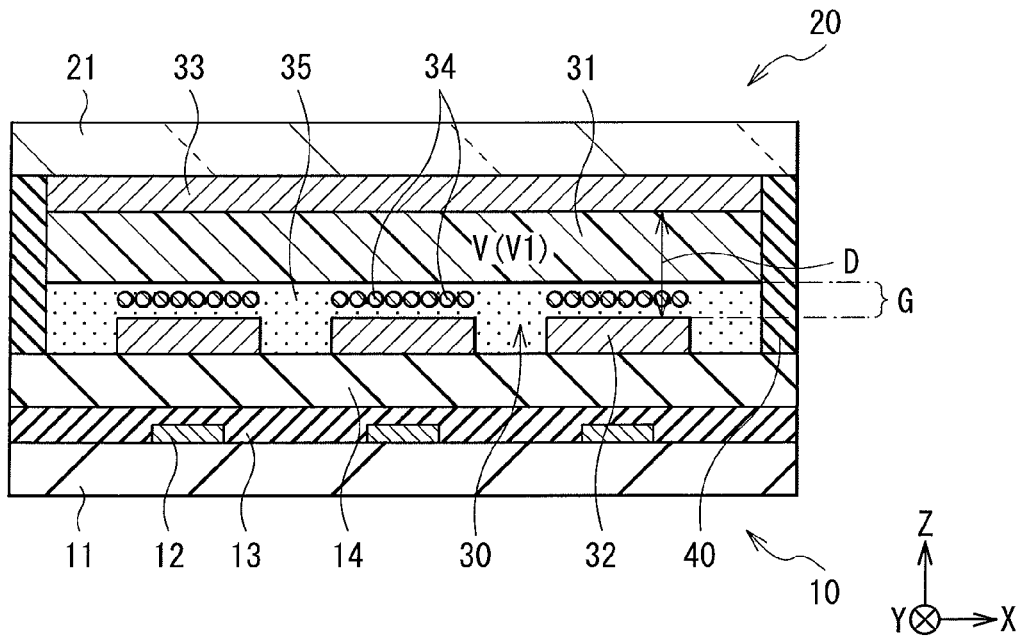
FIG. 8 is a cross-sectional view illustrating another modification of the configuration of the display unit.

Though the porous layer 31 is adjacent to both the pixel electrode 32 and the counter electrode 33 in FIG. 1, the configuration is not limited thereto. For example, as illustrated in FIG. 7, the porous layer 31 may be adjacent to only the pixel electrode 32 and may be separated from the counter electrode 33. Further, for example, as illustrated in FIG. 8, the porous layer 31 may be adjacent to only the counter electrode 33 and may be separated from the pixel electrode 32. In these cases, the gap G is not generated between the porous layer 31, and the pixel electrode 32 and the counter electrode 33 adjacent to the porous layer 31. Therefore, an effect similar to that of the case illustrated in FIG. 1 is obtained. In this case, it is possible to use the porous layer 31 previously compressed so that the thickness T becomes T1.

However, in the case where the porous layer 31 is adjacent to only one of the pixel electrode 32 and the counter electrode 33, the gap G is generated between the porous layer 31 and the electrode not adjacent to the porous layer 31. Therefore, compared to the case that the porous layer 31 is adjacent to both the electrodes, the unintended movement of the electrophoretic particle 34 through the gap G may occur, and the interelectrode distance D becomes larger by an amount of the gap G Therefore, in order to obtain a higher effect, the porous layer 31 is preferably adjacent to both the pixel electrode 32 and the counter electrode 33.

[4. Application Examples of Display Unit (Electronic Units)]

Next, a description will be given of application examples of the foregoing display unit.

The display unit according to an embodiment of the present technology is able to be applied to electronic units for various applications, and types of the electronic units are not particularly limited. For example, the display unit is able to be applied to the following electronic units. However, configurations of the electronic units hereinafter described are only examples, and the configurations thereof may be changed as appropriate.

Figure 9A:
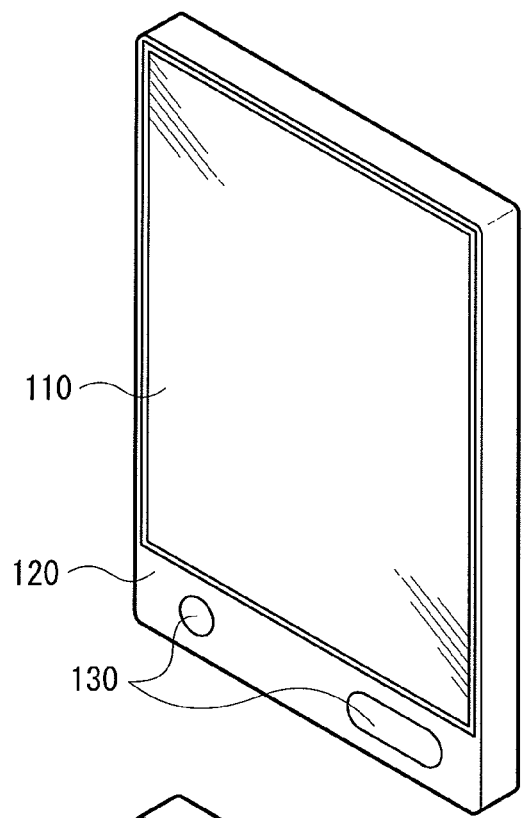
FIGS. 9A and 9B are perspective views illustrating a configuration of an electronic book using the display unit.
Figure 9B:
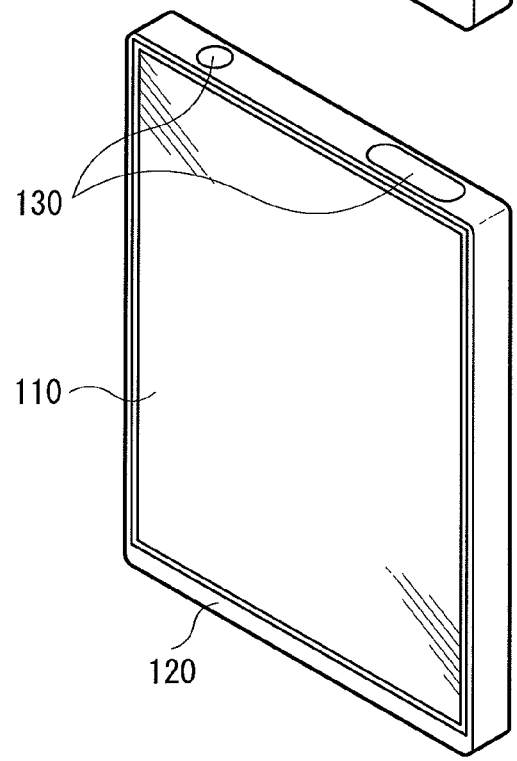

FIGS. 9A and 9B illustrate an appearance configuration of an electronic book. The electronic book includes, for example, a display section 110, a non-display section (package) 120, and an operation section 130. The operation section 130 may be provided on the front face of the non-display section 120 as illustrated in FIG. 9A, and may be provided on the top face as illustrated in FIG. 9B. The display unit may be mounted on a PDA or the like having a configuration similar to that of the electronic book illustrated in FIGS. 9A and 9B.

Figure 10:
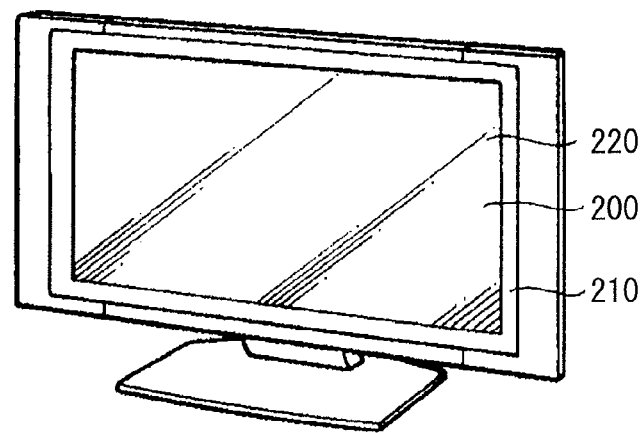
FIG. 10 is a perspective view illustrating a configuration of a television device using the display unit.

FIG. 10 illustrates an appearance configuration of a television device. The television device includes, for example, a video display screen section 200 including a front panel 210 and a filter glass 220.

Figure 11A:
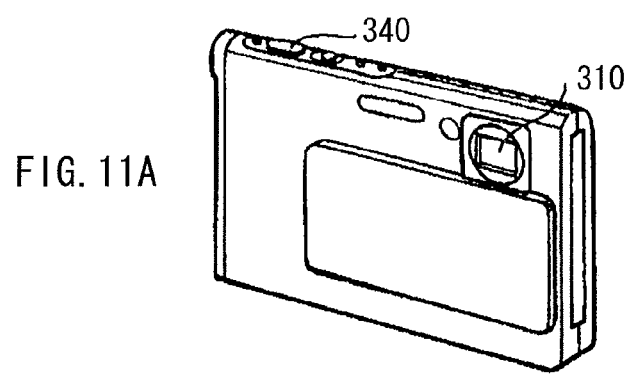
FIGS. 11A and 11B are perspective views illustrating a configuration of a digital still camera using the display unit.
Figure 11B:
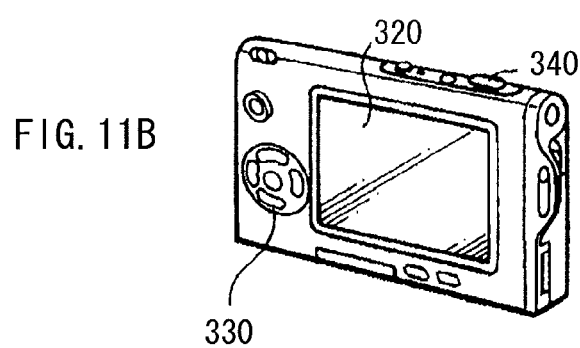

FIGS. 11A and 11B illustrate an appearance configuration of a digital still camera, and FIGS. 11A and 11B respectively illustrate a front face and a rear face thereof. The digital still camera includes, for example, a light emitting section for a flash 310, a display section 320, a menu switch 330, and a shutter button 340.

Figure 12:
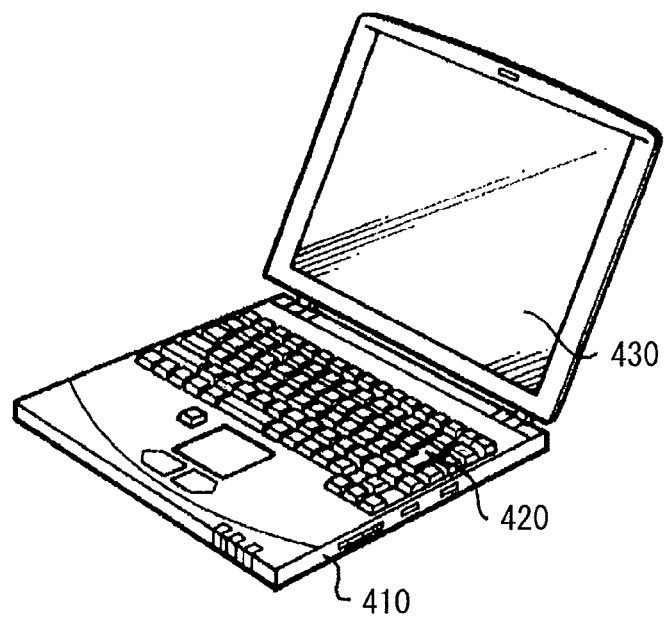
FIG. 12 is a perspective view illustrating an appearance configuration of a personal computer using the display unit.

FIG. 12 illustrates an appearance configuration of a notebook personal computer. The notebook personal computer includes, for example, a main body 410, a keyboard 420 for operation of inputting characters and the like, and a display section 430 for displaying an image.

Figure 13:
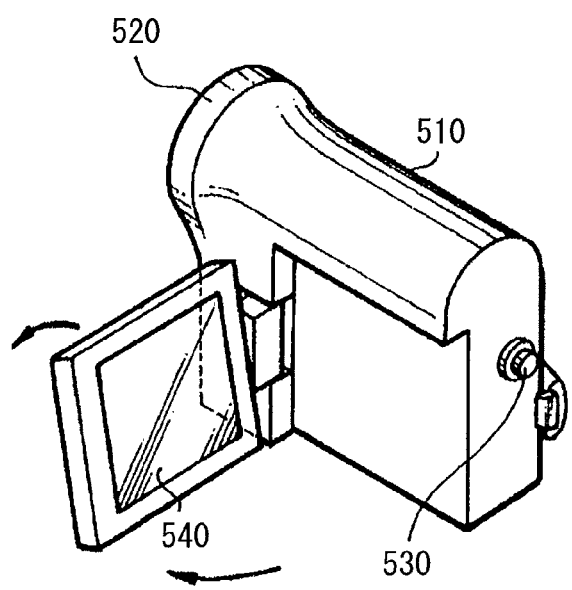
FIG. 13 is a perspective view illustrating an appearance configuration of a video camcorder using the display unit.

FIG. 13 illustrates an appearance configuration of a video camcorder. The video camcorder includes, for example, a main body 510, a lens for shooting an object 520 provided on a front side face of the main body 510, a start/stop switch in shooting 530, and a display section 540.

FIGS. 14A to 14G illustrate an appearance configuration of a mobile phone. FIGS. 14A and 14B respectively illustrate an elevation view and a side view in a state that the mobile phone is opened. FIGS. 14C to 14G illustrate an elevation view, a left side view, a right side view, a top view, and a bottom view in a state that the mobile phone is closed. In the mobile phone, for example, an upper package 610 and a lower package 620 are jointed by a joint section (hinge section) 630. The mobile phone includes a display 640, a sub-display 650, a picture light 660, and a camera 670.

EXAMPLES

Next, a description will be given in detail of examples according to the embodiment of the present technology.

Examples 1 to 11

A display unit was fabricated by using an electrophoretic particle for dark display and a porous layer for light display by the following procedure.

[Preparation of Electrophoretic Particle]

A solution A was obtained by dissolving 42.624 g of sodium hydroxide and 0.369 g of sodium silicate in 43 g of water. Subsequently, while the solution A was stirred, 5 g of composite oxide fine particles (DAIPYROXIDE Color TM3550, available from Dainichiseika Color & Chemicals Mfg. Co., Ltd.) was added to the solution A, and the resultant was stirred (for 15 minutes). After that, ultrasonic stirring (for 15 minutes at from 30 deg C. to 35 deg C. both inclusive) was performed. Subsequently, the solution A was heated (90 deg C.). After that, 15 cm$^3$ (=m1) of vitriolic acid (0.22 mol/cm$^3$) and 7.5 cm$^3$ of an aqueous solution in which 6.5 mg of sodium silicate and 1.3 mg of sodium hydroxide were dissolved were dropped for 2 hours. Subsequently, after the solution A was cooled (down to room temperature), 1.8 cm$^3$ of vitriolic acid (1 mol/cm$^3$) was added. Subsequently, after centrifugal separation (for 30 minutes at 3700 rpm) was performed, decantation was performed. Subsequently, operation in which after redispersion was performed with the use of ethanol, centrifugal separation (for 30 minutes at 3500 rpm) was performed, and decantation was performed was made twice. Subsequently, a mixed solution of 5 cm$^3$ of ethanol and 0.5 cm$^3$ of water was added to each bottle, ultrasonic stirring (for 1 hour) was performed, and thereby a dispersion solution composed of silane coated composite oxide particles was obtained.

Subsequently, 3 cm$^3$ of water, 30 cm$^3$ of ethanol, and 4 g of N-[3-(trimethoxysilyl)propyl]-N'-(4-vinylbenzil)ethylenediamine hydrochloride salt (40% methanol solution) were mixed, and the mixture was stirred (for 7 minutes). After that, the entire amount of the dispersion solution was thrown therein. Subsequently, after the mixed solution was stirred (for 10 minutes), centrifugal separation (for 30 minutes at 3500 rpm) was performed. Subsequently, after decantation was performed, washing operation in which after redispersion was performed with the use of ethanol, centrifugal separation (for 30 minutes at 3500 rpm) was performed was made twice. Subsequently, after decantation was performed, the resultant was dried (for 6 hours) in reduced pressure environment (at room temperature). After that, the resultant was further dried (for 2 hours) in reduced pressure environment (at 70 deg C.), and thereby a solid material was obtained.

Subsequently, the solid material was added with 50 cm$^3$ of toluene to obtain solution B. After that, the resultant was stirred by a roll mill (for 12 hours). Subsequently, the solution B was moved to a three-neck flask, into which 1.7 g of 2-ethylhexyl acrylate was thrown. After that, the resultant was stirred under nitrogen gas stream (for 20 minutes). Subsequently, the solution B was stirred (for 20 minutes at 50 deg C.). The resultant was added with a solution C in which 0.01 g of AIBN was dissolved in 3 cm$^3$ of toluene, and was subsequently heated (at 65 deg C.). Subsequently, after the mixed solution was stirred (for 1 hour), the mixed solution was cooled (down to room temperature), and was thrown into a bottle together with ethyl acetate, and centrifugal separation (for 30 minutes at 3500 rpm) was performed. Subsequently, after decantation was performed, washing operation in which, after redispersion was performed with the use of ethyl acetate, centrifugal separation (for 30 minutes at 3500 rpm) was performed was made three times. Subsequently, after the resultant was dried (for 12 hours) in reduced pressure environment (at room temperature), the resultant was further dried (for 2 hours) in reduced pressure environment (at 70 deg C.). Thereby, black electrophoretic particles composed of polymer-coated pigment were obtained.

[Preparation of Insulating Liquid]

As an insulating liquid, an isoparaffin (IsoparG, available from Exxon Mobil Corporation) solution containing 0.5% of methoxysulfonyloxymethane (Solsperse 17000, available from Lubrizol Co.) and 1.5% of sorbitanlaurate (Span 20) was prepared. Subsequently, after 0.1 g of the electrophoretic particles was added to 9.9 g of the insulating liquid, the resultant was stirred by a beads mill (for 5 minutes). Subsequently, after the resultant was stirred (for 4 hours) by a homogenizer to which zirconia beads (0.03 mm $\phi$) were added, the beads were removed. After that, the average particle diameter of the electrophoretic particles was measured by Zeta electric potential/particle diameter measurement system ELSZ-2 (available from Otsuka Electronics Co., Ltd.). The measurement value was 100 nm.

[Preparation of Porous Layer]

A solution D was prepared by dissolving 7.5 g of polyacrylonitrile (available from Aldrich Co., molecular weight: 150000) as a formation material of a fibrous structure in 92.5 g of N,N'-dimethylformamide. Subsequently, 30 g of titanium oxide (TITONE R-45M, available from Sakai Chemical Industry Co., Ltd.) as a non-electrophoretic particle was added to 70 g of the solution D. After that, the resultant was mixed by a beads mill to prepare a spinning solution. Subsequently, the spinning solution was thrown in a syringe, and 8 round trips of spinning were performed by using an electrostatic spinning apparatus (NANON, available from MECC Co., Ltd.) on a glass substrate on which a pixel electrode (ITO) in the shape of a given pattern is formed. As spinning conditions, the electric field intensity was 28 kV, the discharge rate was 0.5 cm$^3$/min, the spinning distance was 15 cm, and the scanning rate was 20 mm/sec. At that time, the thickness T (T2) and the volume fraction V (V2) of the porous layer were respectively illustrated in Table 1. Subsequently, the glass substrate was dried for 12 hours in a vacuum oven (at 75 deg C.) to form a fibrous structure containing a non-electrophoretic particle.

[Assembly of Display Unit]

A part that may be unnecessary of the porous layer attached to a region where the pixel electrode was not formed was removed from the glass substrate on which the pixel electrode (ITO) was formed. Subsequently, after a spacer was arranged on the glass substrate on which a counter electrode (ITO) was entirely formed, the glass substrate over which the pixel electrode and the porous layer were formed was layered thereon. In this case, tracing was made by using a light cured resin (photosensitive resin Photoreck A-400, available from Sekisui Chemical Co., Ltd.) containing beads (outer diameter: 30 μm) in location on which the porous layer was not layered. Subsequently, the insulating liquid in which the electrophoretic particles were dispersed was injected between the two glass substrates. In this case, after the porous layer became adjacent to the pixel electrode and the counter electrode by entirely pressing with a roller as appropriate, the entire body was further pressed to compress the porous layer. Finally, the resultant was irradiated with ultraviolet light to cure the light cured resin. The thickness T (T1) and the volume fraction V (V1) of the porous layer after pressing were respectively shown in Table 1. In this case, to control the thickness T1 and the volume fraction V1, the suppress strength, the suppress time, and the like were adjusted.

In the case where pressing was performed by a roller, the display unit illustrated in FIG. 1 was formed. Meanwhile, in the case where pressing was not performed by the roller, the display unit illustrated in FIG. 6 was formed. In the latter case, the porous layer was supported by the spacer, and the porous layer was separated from the pixel electrode and the counter electrode. The interelectrode distances D after completion of the display unit were shown in Table 1.

In display units of Examples 1 to 11, after an AC voltage (0.1 Hz and 15 V) was applied for 1 hour, white reflectance (%) and black reflectance (%) were measured, and thereby contrast=white reflectance/black reflectance was calculated. In this case, the white reflectance and the black reflectance in the substrate normal line direction to a standard diffusion plate were measured with 45 deg/−0 deg ring lighting by using a spectrophotometer (eye-one pro, available from X-Rite).

Further, luminance was measured while a shortwave electric field (15 V) was applied by using a function generator (available from Toyotechnica). In this case, under the conditions in which the luminance in a white state was 1 and the luminance in a black state was 0, an average value (response time (s)) of time necessary to change the luminance from 0.1 to 0.9 by applying an electric field and time necessary to change the luminance from 0.9 to 0.1 after stopping application of the electric field was calculated.

In particular, in the case where the porous layer was adjacent to the pixel electrode and the counter electrode, if the porous layer was compressed, contrast was more increased, and response time was more shortened. Specifically, in the case where the volume fraction V1 of the porous layer was 2 volume % or more, or more specifically, in the case where the volume fraction V1 of the porous layer was from 2 volume % to 10 volume % both inclusive, excellent contrast and excellent response time were obtained.

From the result shown in Table 1, it was found as follows. That is, in the case where the porous layer is formed of the fibrous structure containing the non-electrophoretic particle having optical reflection characteristics different from those of the electrophoretic particle, and the porous layer is adjacent to the pixel electrode and the counter electrode, contrast and response time are improved.

While the present technology has been described with reference to the embodiment, the present technology is not limited to the aspects described in the foregoing embodiment, and various modifications may be made. For example, application of the electrophoretic device of the present technology is not limited to the display unit, and the electrophoretic device of the present technology may be applied to other electronic unit.

The present technology contains subject matter related to that disclosed in Japanese Priority Patent Application JP 2011-062921 filed in the Japanese Patent Office on Mar. 22, 2011, the entire contents of which is hereby incorporated by reference.

TABLE 1

| Example | Thickness T2 (μm) | Thickness T1 (μm) | Interelectrode distance D (μm) | Volume fraction V2 (volume %) | Volume fraction V1 (volume %) | White reflectance (%) | Contrast | Response time (s) |
|---|---|---|---|---|---|---|---|---|
| 1 | 120 | 30 | 30 | 1.55 | 6.31 | 56 | 47 | 0.7 |
| 2 | 100 | 30 | 30 | 1.59 | 5.29 | 55 | 46 | 0.7 |
| 3 | 80 | 30 | 30 | 1.58 | 4.21 | 53 | 44 | 0.7 |
| 4 | 60 | 30 | 30 | 1.59 | 3.17 | 45 | 38 | 0.7 |
| 5 | 40 | 30 | 30 | 1.55 | 2.07 | 37 | 31 | 0.7 |
| 6 | 120 | 50 | 50 | 1.55 | 3.72 | 56 | 47 | 1.5 |
| 7 | 60 | 60 | 60 | 1.55 | 1.55 | 40 | 13 | 2.3 |
| 8 | 100 | 100 | 120 | 1.59 | 1.59 | 41 | 6.8 | 6.5 |
| 9 | 80 | 80 | 120 | 1.58 | 1.58 | 39 | 6.6 | 6.5 |
| 10 | 60 | 60 | 120 | 1.59 | 1.59 | 34 | 5.7 | 6.6 |
| 11 | 40 | 40 | 120 | 1.55 | 1.55 | 27 | 4.5 | 6.5 |

In the case where the porous layer was adjacent to the pixel electrode and the counter electrode (Examples 1 to 7), higher contrast was obtained and response time was decreased, compared to in the case that the foregoing conditions were not satisfied (Examples 8 to 11).

A remarkable difference in contrast and response time as described above possibly resulted from the following reason. In the case where the porous layer is not adjacent to the pixel electrode and the counter electrode, the electrophoretic particle easily moves through the gap between the porous layer, and the pixel electrode and counter electrode unintentionally. Therefore, at the time of continuously applying a voltage, the electrophoretic particle easily becomes a state of flocculation. Thereby, the white reflectance is decreased while the black reflectance is increased, and therefore contrast is decreased. In addition, since the movement of the electrophoretic particle expends time, the response time becomes longer. Meanwhile, in the case where the porous layer is adjacent to the pixel electrode and the counter electrode, the electrophoretic particle is less likely to move even at the time of continuously applying a voltage. Therefore, contrast is increased, and response time becomes short.

It should be understood by those skilled in the art that various modifications, combinations, sub-combinations and alternations may occur depending on design requirements and other factors insofar as they are within the scope of the appended claims or the equivalents thereof.

What is claimed is:

1. An electrophoretic device comprising:
   an electrophoretic particle;
   a porous layer formed of a fibrous structure containing a non-electrophoretic particle having optical reflection characteristics different from optical reflection characteristics of the electrophoretic particle; and
   a pair of electrodes arranged with the porous layer in between,
   wherein,
      the porous layer is adjacent to one or both of the pair of electrodes, and wherein at least one of:
         an occupying ratio of the non-electrophoretic particle in the porous layer is from 2 volume % to 10 volume % both inclusive,
         a reflectance of the non-electrophoretic particle is equal to or greater than 2, and an average particle diameter of the non-electrophoretic particle is from 200 nm to 1000 nm both inclusive.

2. The electrophoretic device according to claim 1, wherein light reflectance of the non-electrophoretic particle is higher than light reflectance of the electrophoretic particle.

3. The electrophoretic device according to claim 1, wherein the non-electrophoretic particle contains titanium oxide.

4. The electrophoretic device according to claim 1, wherein the fibrous structure is formed of a polymer material or an inorganic material, and
the electrophoretic particle and the non-electrophoretic particle are formed from an organic pigment, an inorganic pigment, a dye, a carbon material, a metal material, a metal oxide, glass, or a polymer material.

5. The electrophoretic device according to claim 1, wherein the fibrous structure is formed by an electrostatic fiber forming method, and an average fiber diameter thereof is equal to or smaller than 10 μm.

6. The electrophoretic device according to claim 1, wherein the non-electrophoretic particle is partially exposed from the fibrous structure.

7. The electrophoretic device according to claim 1, wherein the non-electrophoretic particle is partially buried inside the fibrous structure.

8. An eletrophoretic device comprising:
an electrophoretic particle;
a porous layer formed of a fibrous structure containing a non-electrophoretic particle having optical reflection characteristics different from optical reflection characteristics of the electrophoretic particle; and
a pair of electrodes arranged with the porous layer in between,
wherein:
the porous layer is adjacent to one or both of the pair of electrodes, wherein:
an occupying ratio of the non-electrophoretic particle in the porous layer is from 2 volume % to 10 volume % both inclusive,
a reflectance of the non-electrophoretic particle is equal to or greater than 2, and
an average particle diameter of the non-electrophoretic particle is from 200 nm to 1000 nm both inclusive.

9. A display unit comprising:
an electrophoretic device between a pair of base substances, one or both of the pair of the base substances having light transmission characteristics,
wherein,
the electrophoretic device includes (a) an electrophoretic particle, (b) porous layer formed of a fibrous structure containing a non-electrophoretic particle having optical reflection characteristics different from optical reflection characteristics of the electrophoretic particle, and (c) a pair of electrodes arranged with the porous layer in between, wherein the porous layer is adjacent to one or both of the pair of electrodes, and
wherein at least one of:
an occupying ratio of the non-electrophoretic particle in the porous layer is from 2 volume % 10 volume % both inclucive,
a reflectance of the non-electrophoretic particle is equal to or greater than 2, and
an average particle diameter of the non-electrophotetic particle is from 200 nm to 1000 nm both inclucive.

10. An electronic unit comprising:
a display unit having an electrophoretic device between a pair of base substances, one or both of the pair of the base substances having light transmission characteristics,
wherein,
the electrophoretic device includes (a) an electrophoretic particle, (b) a porous layer formed of a fibrous structure containing a non-electrophoretic particle having optical reflection characteristics different from optical reflection characteristics of the electrophoretic particle, and (c) a pair of electrodes arranged with the porous layer in between, wherein the porous layer is adjacent to one or both of the pair of electrodes, and
wherein at least one of:
an occupying ratio of the non-electrophoretic particle in the porous layer is from 2 volume % 10 volume % both inclusive,
a reflectance of the non-electrophoretic particle is equal to or greater than 2, and
an average particle diameter of the non-electrophotetic particle is from 200 nm to 1000 nm both inclucive.

* * * * *